(12) United States Patent
Meyer et al.

(10) Patent No.: US 10,876,617 B2
(45) Date of Patent: Dec. 29, 2020

(54) METHODS AND SYSTEM FOR OPERATING A DRIVELINE

(71) Applicant: Ford Global Technologies, LLC, Dearborn, MI (US)

(72) Inventors: Jason Meyer, Canton, MI (US); Kevin Ray Ruybal, Canton, MI (US); Jeffrey Doering, Canton, MI (US); Matthew John Shelton, Grosse Ile, MI (US); Steven A. Frait, Milan, MI (US); Walter J. Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 15/891,169

(22) Filed: Feb. 7, 2018

(65) Prior Publication Data

US 2018/0259058 A1 Sep. 13, 2018

Related U.S. Application Data

(60) Provisional application No. 62/469,878, filed on Mar. 10, 2017.

(51) Int. Cl.
| | |
|---|---|
| *B60K 6/442* | (2007.10) |
| *F16H 57/04* | (2010.01) |
| *F16H 63/24* | (2006.01) |
| *F16H 61/02* | (2006.01) |
| *F16H 61/688* | (2006.01) |
| *F16H 63/02* | (2006.01) |
| *F16H 59/72* | (2006.01) |
| *F16H 59/74* | (2006.01) |
| *F16H 61/00* | (2006.01) |

(52) U.S. Cl.
CPC ......... *F16H 57/0412* (2013.01); *B60K 6/442* (2013.01); *F16H 57/0436* (2013.01); *F16H 61/0213* (2013.01); *F16H 61/688* (2013.01); *F16H 63/24* (2013.01); *B60Y 2300/186* (2013.01); *B60Y 2300/428* (2013.01); *B60Y 2306/05* (2013.01); *F16H 2059/725* (2013.01); *F16H 2059/743* (2013.01); *F16H 2061/0037* (2013.01); *F16H 2061/0241* (2013.01); *F16H 2063/025* (2013.01)

(58) Field of Classification Search
CPC ....... B60K 6/442; B60W 10/06; B60W 10/02; B60W 10/08; B60W 20/20
See application file for complete search history.

(56) References Cited

U.S. PATENT DOCUMENTS

| | | | |
|---|---|---|---|
| 8,647,231 B2 | 2/2014 | Soliman et al. | |
| 8,706,337 B2 | 4/2014 | Rauner et al. | |
| 9,481,235 B1* | 11/2016 | Banshoya | F16H 3/728 |
| 9,487,210 B2* | 11/2016 | Yamamoto | B60K 6/365 |
| 9,956,954 B2* | 5/2018 | Hata | B60K 6/387 |
| 9,987,917 B2* | 6/2018 | Oba | B60K 6/442 |

(Continued)

*Primary Examiner* — Emma K Frick
(74) *Attorney, Agent, or Firm* — David Kelley; McCoy Russell LLP

(57) ABSTRACT

Methods and systems for operating a driveline that includes a dual clutch transmission are described. In one example, clutches of the dual clutch transmission may be cooled via activating and adjusting a flow rate of an electric pump. Further, driveline operating modes may be entered or exited in response to clutch operating conditions so that driveline robustness may be enhanced.

11 Claims, 10 Drawing Sheets

(56) References Cited

U.S. PATENT DOCUMENTS

2011/0301792 A1 12/2011 Yamazaki et al.
2012/0022731 A1 1/2012 Kuang et al.
2013/0297107 A1 11/2013 Dai et al.

* cited by examiner

METHODS AND SYSTEM FOR OPERATING A DRIVELINE

CROSS REFERENCE TO RELATED APPLICATION

The present application claims priority to U.S. Provisional Patent Application No. 62/469,878 entitled "Methods and System for Operating a Driveline," filed on Mar. 10, 2017. The entire contents of the above-referenced application are hereby incorporated by reference in their entirety for all purposes.

FIELD

The present description relates generally to methods and systems for controlling a driveline of a vehicle. The methods and systems may be particularly useful for vehicles that include a dual clutch transmission.

BACKGROUND/SUMMARY

A driveline that includes a dual clutch transmission without a torque converter may be a challenge to control during some conditions. A driveline that does not include a torque converter may have to slip clutches to control torque delivered to vehicle wheels when the vehicle is operated at low vehicle speeds. However, if one of the clutches is slipping for an extended amount of time, the clutch may degrade due to the clutch's temperature being high. Maintaining clutch temperature below a temperature where clutch degradation may begin may be especially difficult during stop and go vehicle conditions where there may not be time for the temperature of the slipping clutch to be reduced. In addition, clutch temperature may continue to increase even after the transmission is shifted out of first gear after vehicle launch because the clutch may supply engine torque to vehicle wheels via a plurality of gears that are selectively engaged and disengaged to a transmission half shaft.

The inventors herein have recognized the above-mentioned issues and have developed a driveline operating method, comprising: delivering engine torque to vehicle wheels via a first clutch and a second clutch, the first clutch transmitting engine torque to the vehicle wheels via a first group of gears, the second clutch transmitting engine torque to the vehicle wheels via a second group of gears; and delivering engine torque to the vehicle wheels only via the second clutch in response to an amount of energy absorbed via the first clutch exceeding a threshold.

By delivering engine torque to vehicle wheels only via a single clutch and a plurality of gears, it may be possible to reduce a temperature of a second clutch so that the possibility of the second clutch degrading is reduced. For example, if a first clutch that transfers engine torque to first gear of a transmission absorbs or receives energy from the engine sufficient to heat the first clutch to greater than a threshold temperature, then the first clutch may be opened and not used to transfer engine torque to vehicle wheels until a temperature of the first clutch is less than the threshold temperature. The second clutch may be opened and closed while the first clutch is held open to selectively engage and disengage gears that may be provided engine torque via the second clutch. Thus, if the first clutch absorbs or receives more than a threshold amount of energy from the engine, the first clutch may be opened and the second clutch may be opened and closed to engage and disengage second, fourth, and sixth gears. In this way, the transmission may be shifted as vehicle speed increases without having to close the first clutch. The first clutch may subsequently transfer engine torque to first, third, and fifth transmission gears after a temperature of the first clutch is reduced.

The present description may provide several advantages. In particular, the approach may improve transmission durability. Further, the approach provides for transmission gear shifting even if temperature of one clutch is greater than desired. In addition, the approach provides for an increased rate of transmission clutch cooling while the transmission may continue to be shifted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
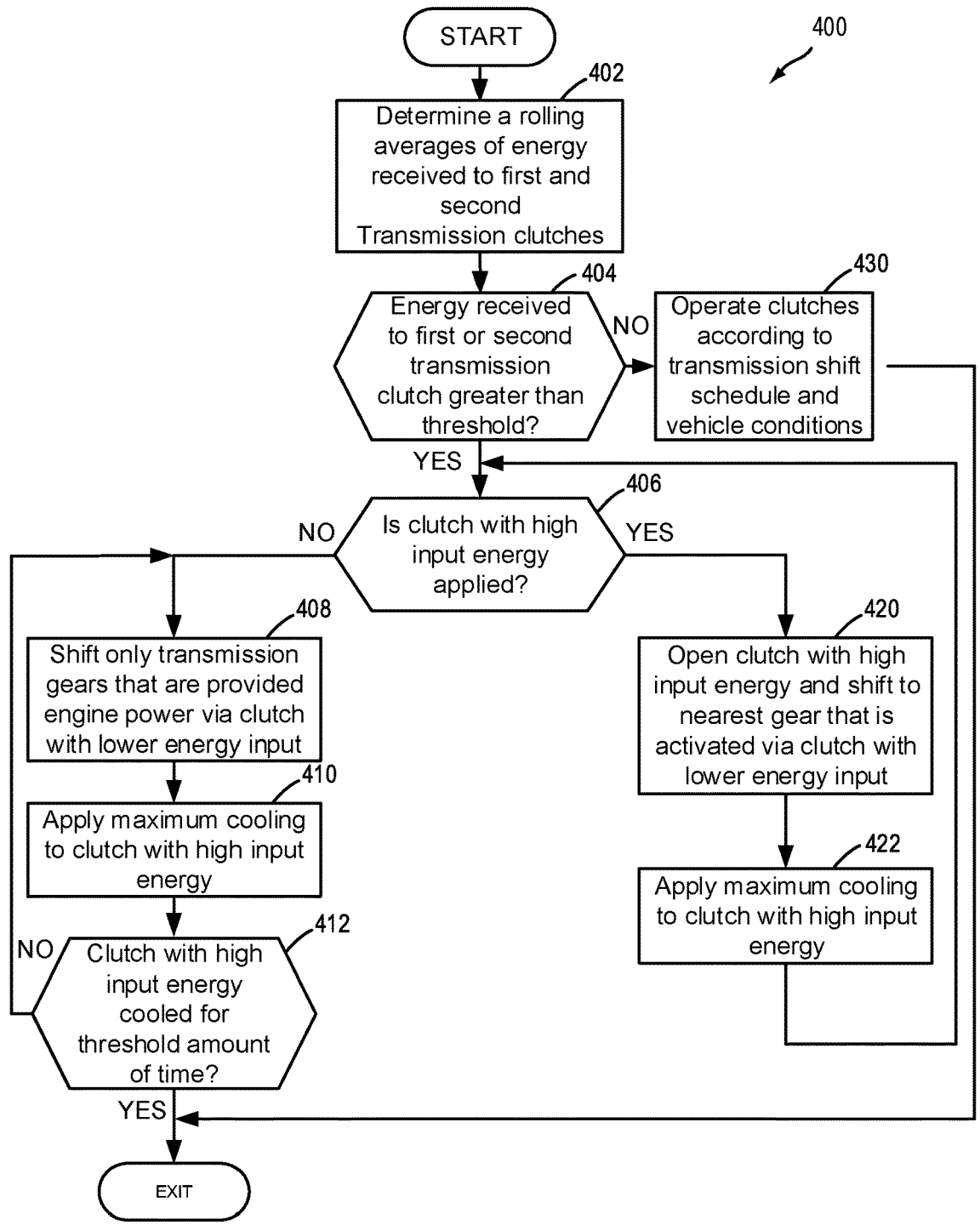
FIG. 4 is a flowchart of a method for shifting a transmission.
Figure 5:
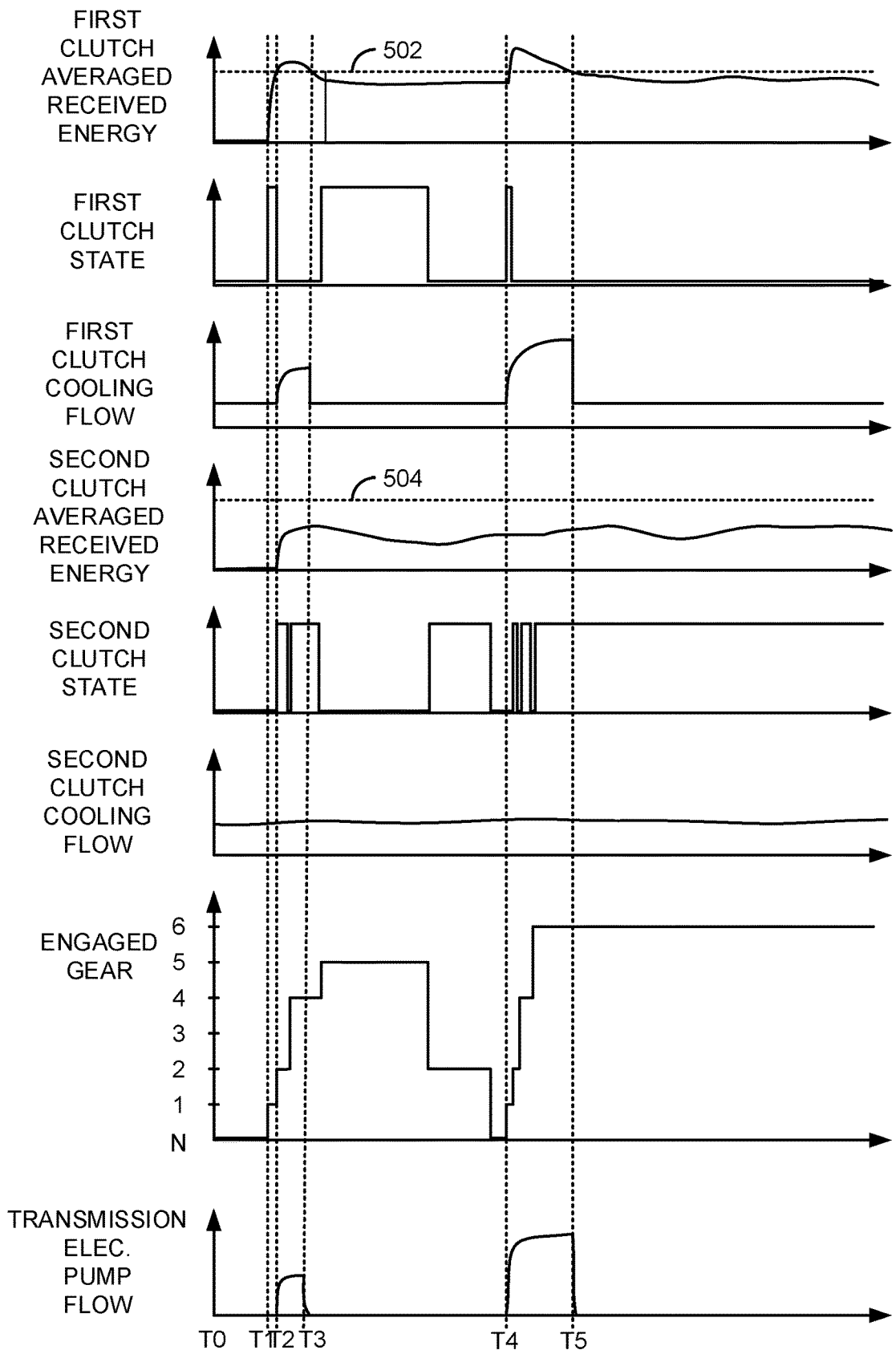
FIG. 5 is a prophetic driveline operating sequence according to the method of FIG. 4.
Figure 6:
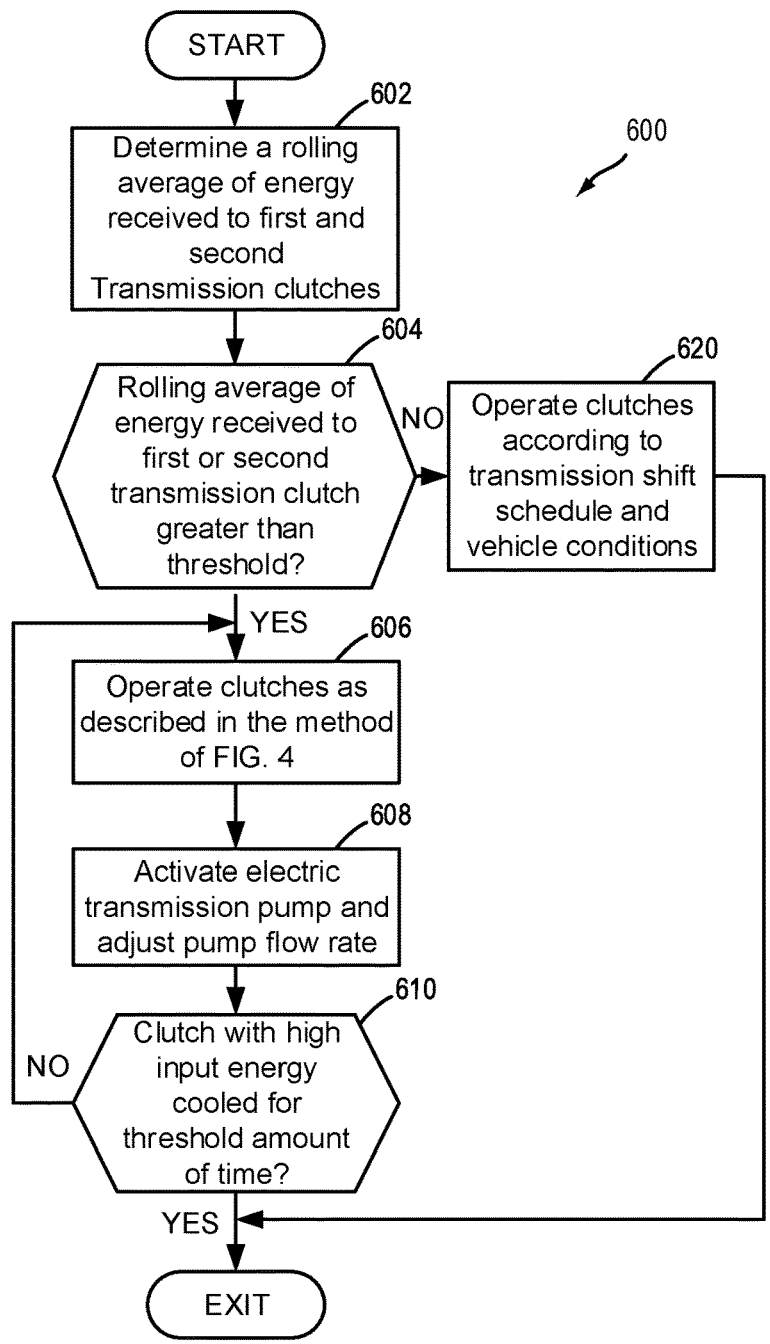
FIG. 6 is a flowchart of a method for operating a pump of a transmission.
Figure 7A:
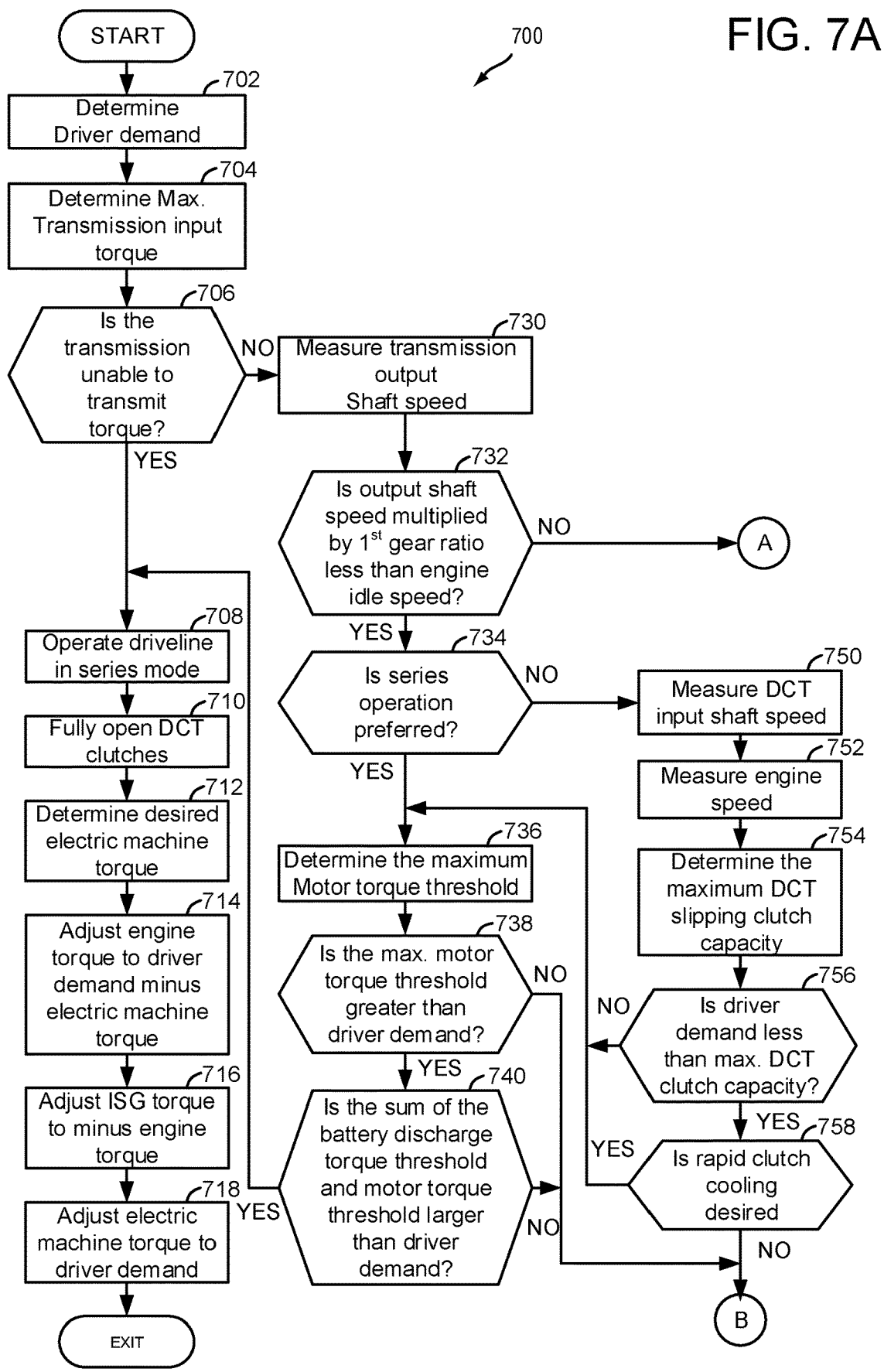
FIGS. 7A and 7B show a flowchart of a method to select a vehicle operating mode.
Figure 7B:
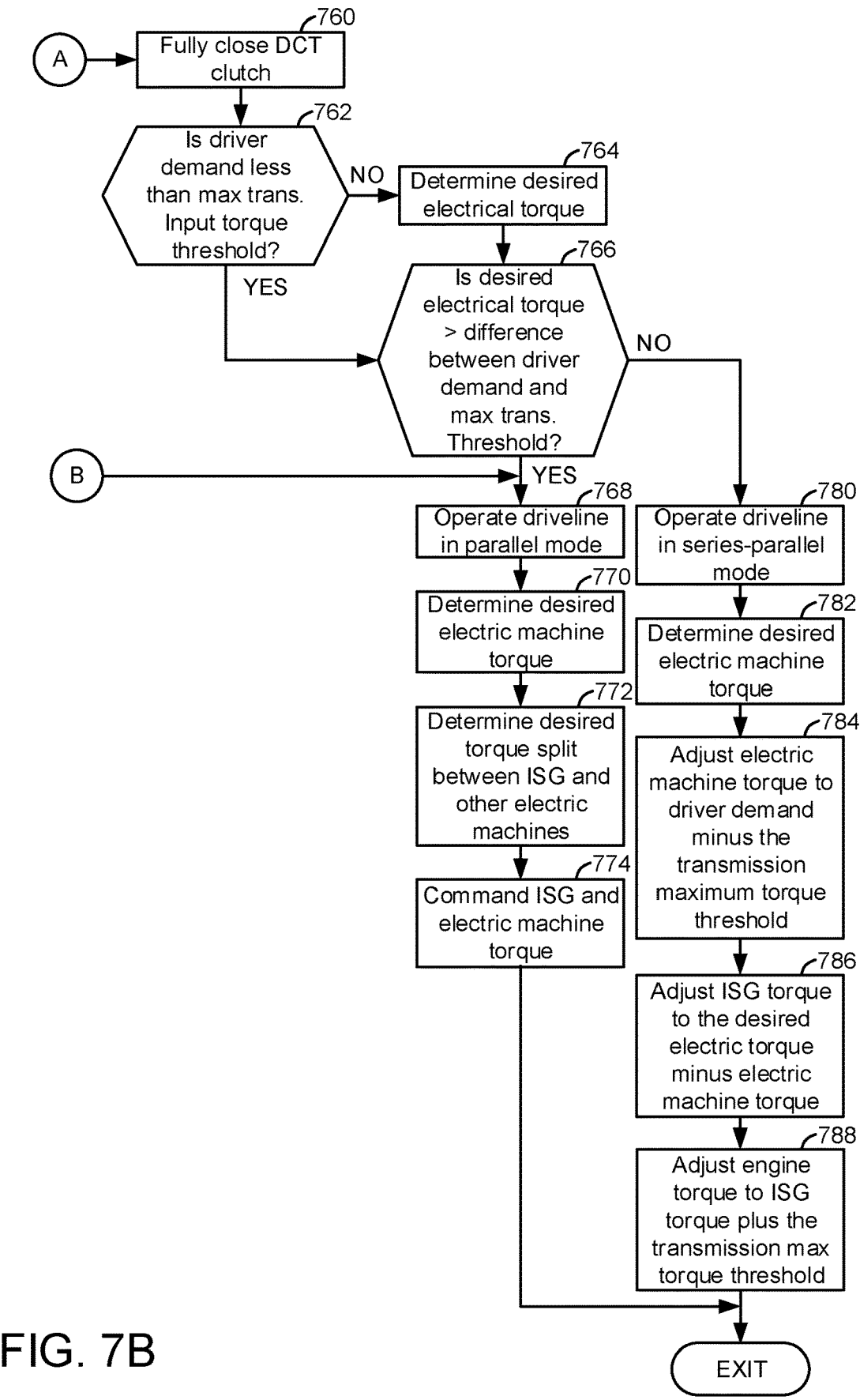

The following description relates to systems and methods for operating a driveline of a vehicle. FIGS. 1A-3 show an example hybrid vehicle driveling that includes an internal combustion engine, an integrated starter/generator, a dual clutch transmission, and an electric machine. FIG. 4 shows a flowchart of a method for shifting a transmission and controlling a transmission clutch. FIG. 5 shows a prophetic driveline operating sequence according to the method of FIGS. 4 and 6. A flowchart of a method to control a transmission pump is shown in FIG. 6. A method for selecting and applying a variety of driveline operating modes is shown in FIGS. 7A and 7B.

Figure 1A:
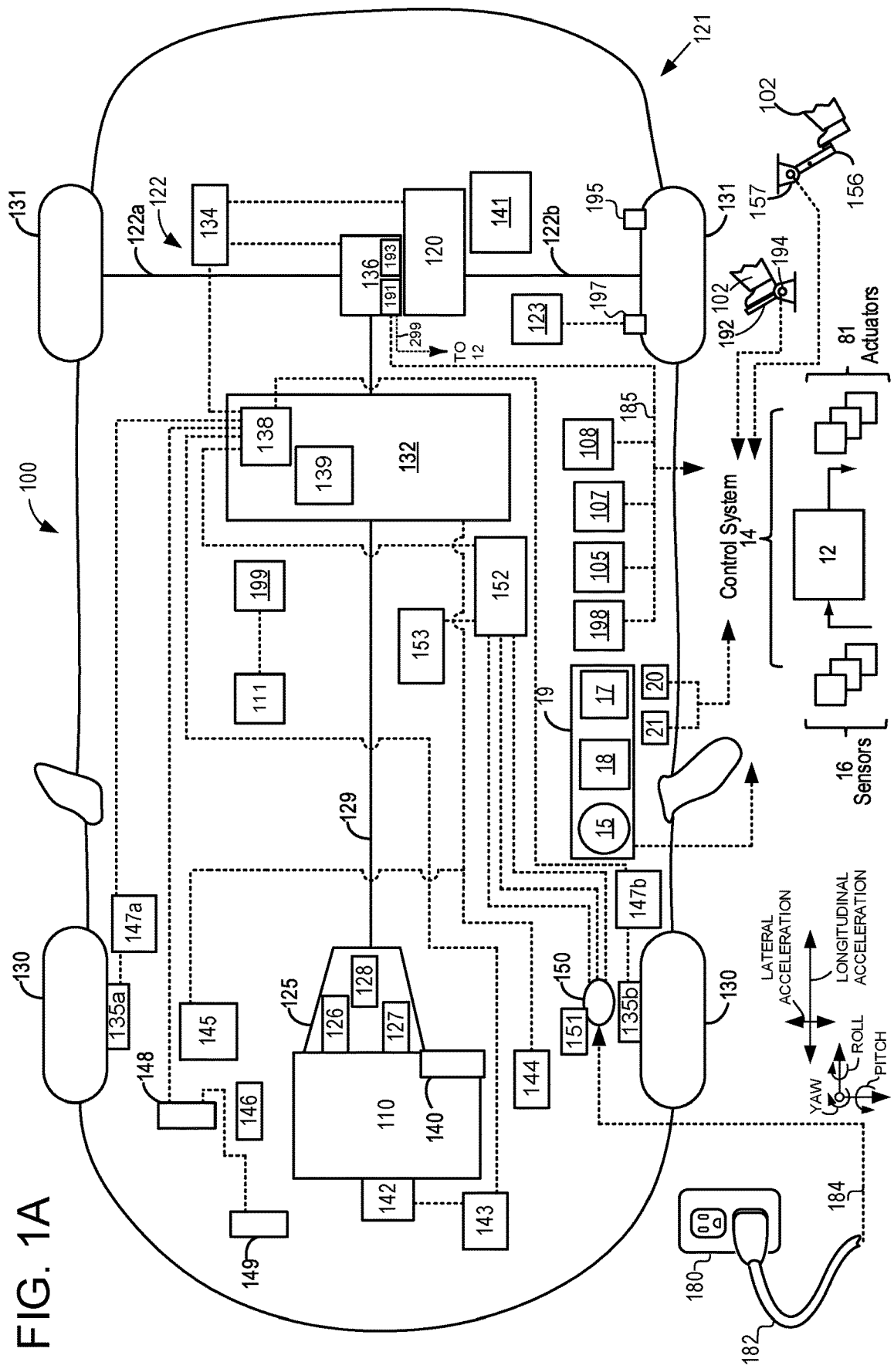
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122*a*, and second half shaft 122*b*. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122*a* and to axle 122*b*. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122*a* and 122*b* may be equal when electrically controlled differential clutch is open. Torque transfer to axle 122*a* may be different from torque transferred to axle 122*b* when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147a may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 as shown in FIG. 1C.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
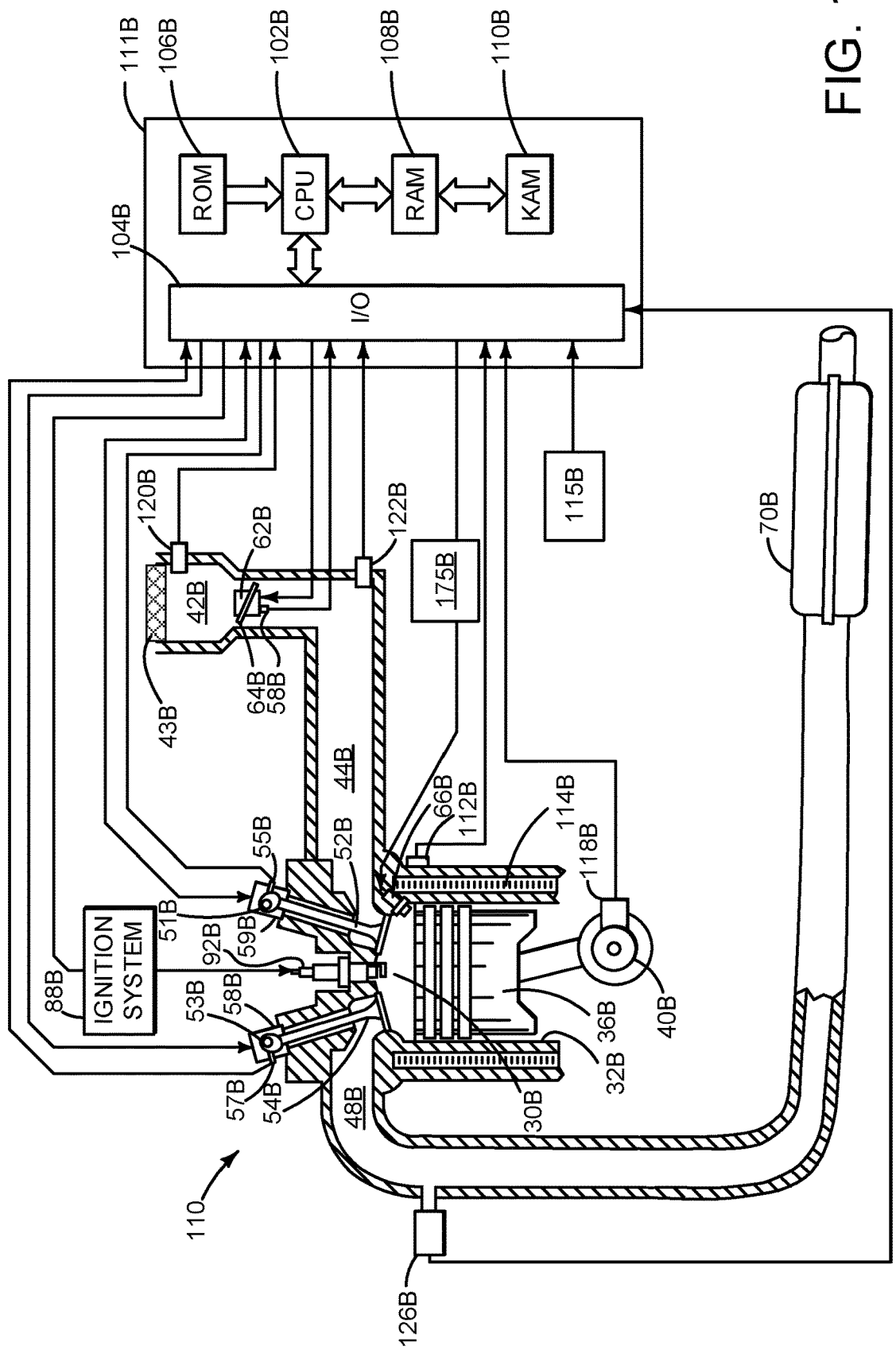
FIG. 1B is a sketch of an engine of the hybrid vehicle driveline.
Figure 1C:
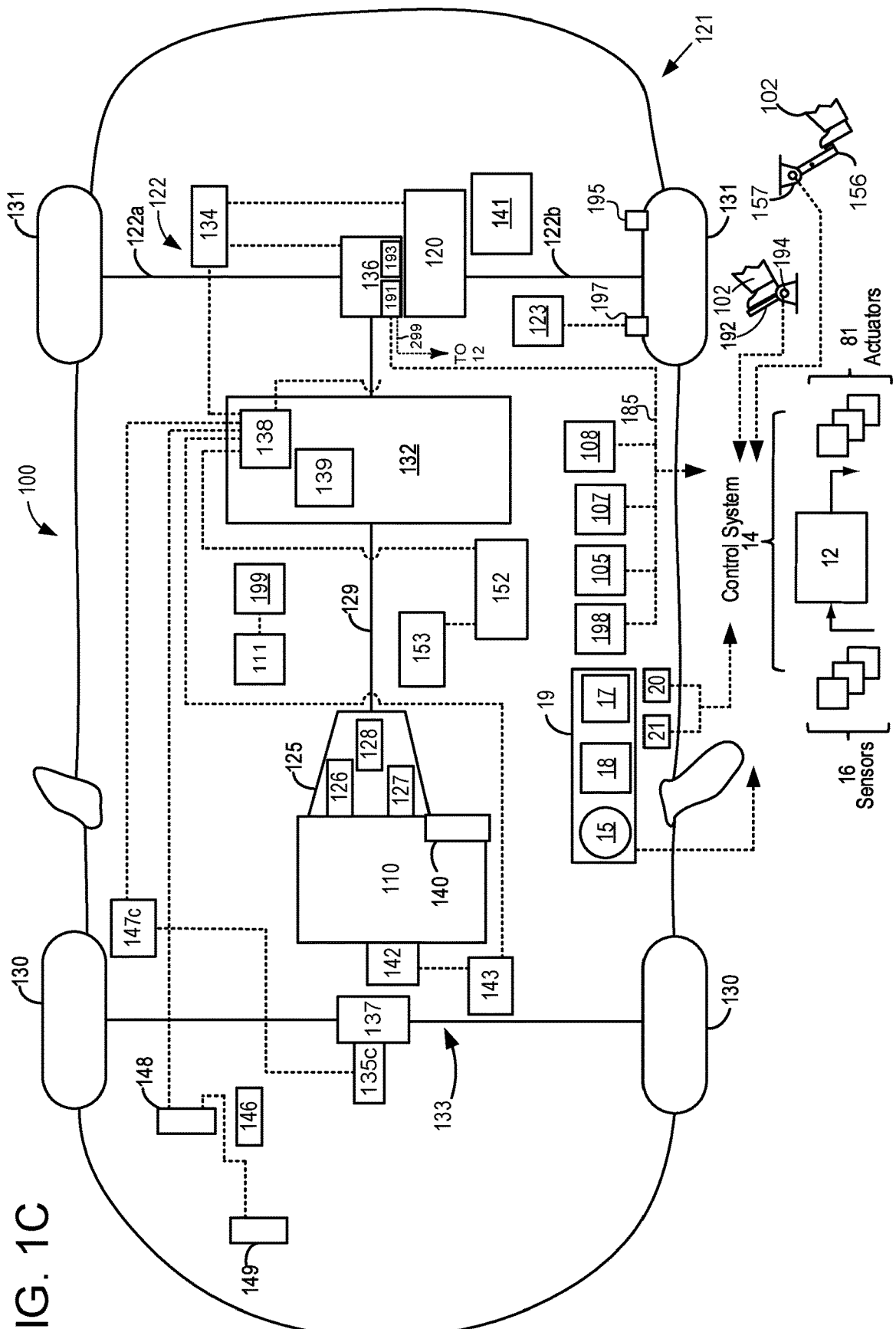
FIG. 1C is a schematic diagram of an alternative hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135c may provide positive or negative torque to front wheels 130 via front drive unit 137, which may include a differential. In some examples, the electric machine 135c and the front drive unit 137 are considered part of front axle 133. Thus, front axle 133 may provide regenerative braking or torque to propel vehicle 121. Further, electric machine 135c may receive electrical power from, or provide electrical power to, electric energy storage device 132. Front axle 133 may be referred to as an independently driven axle. The other components shown in FIG. 1C may operate as previously described.

Figure 2:
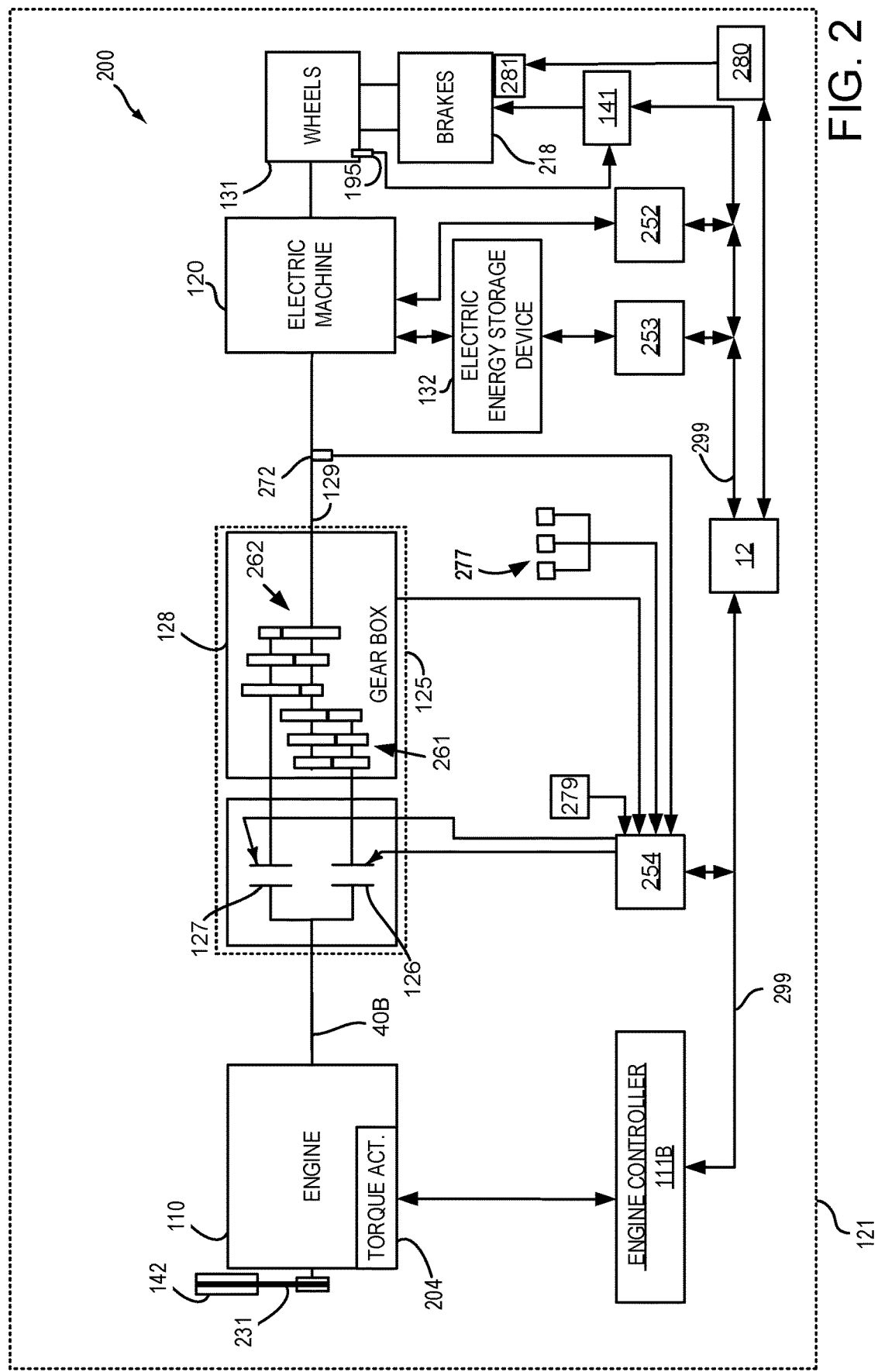
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-1C. Other components of FIG. 2 that are common with FIGS. 1A and 1C are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
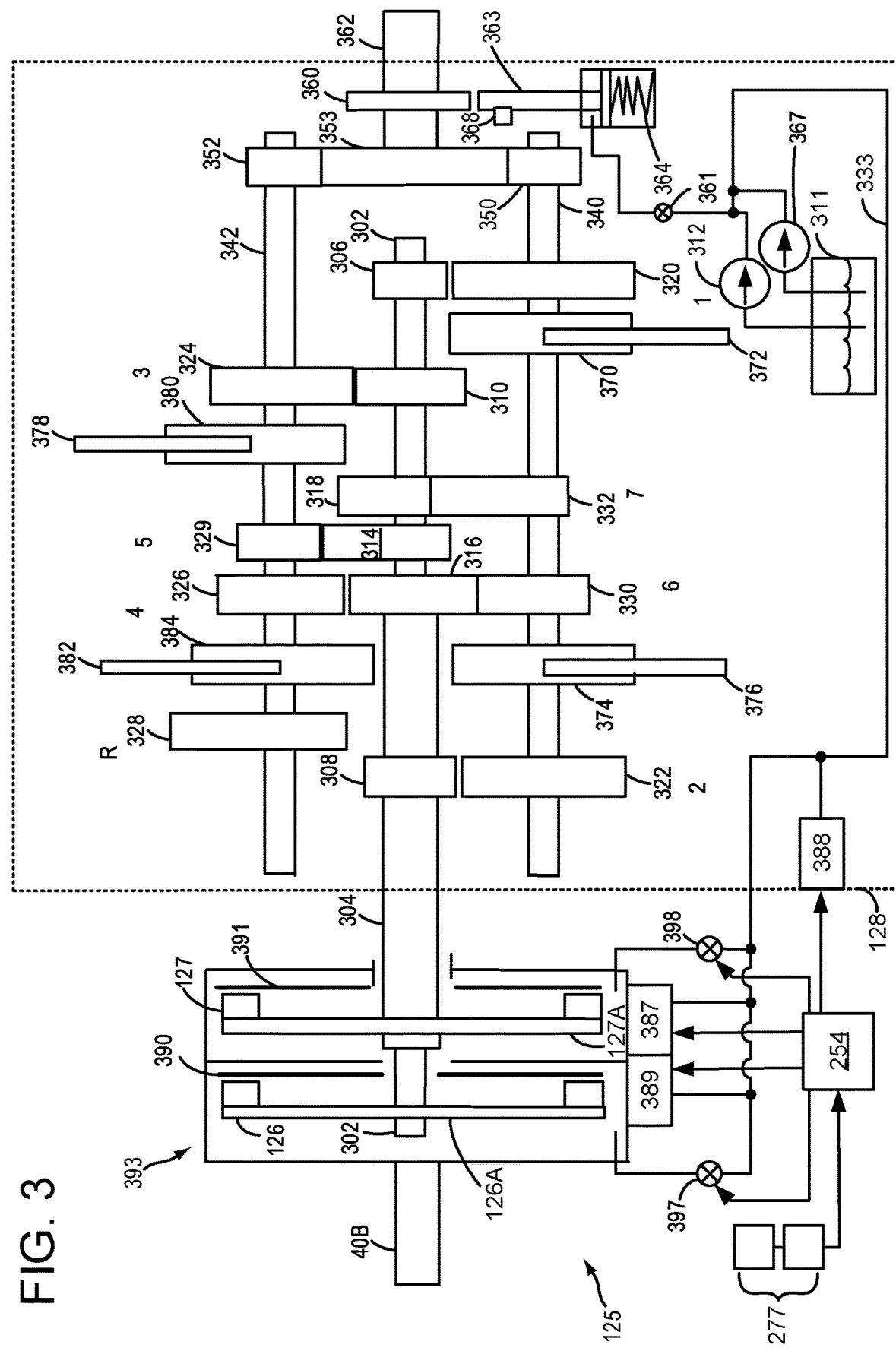
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

First clutch 126 may be cooled via fluid supplied via pump 312 and/or pump 367. Valve 397 may be opened to cool first clutch 126. First clutch 126 may be cooled at a rate that is significantly greater when first clutch is open and valve 397 is open since flow of fluid to first clutch 126 may be ten times greater than flow of fluid to first clutch 126 when first clutch 126 is closed. In this example, fluid flow to first clutch 126 is via conduit 333, which services valve 398 and other devices. However, in other examples, conduit 333 may be directly coupled to valve 397 to provide more precise fluid flow control. Similarly, second clutch 127 may be cooled via fluid supplied via pump 312 and/or pump 367. Valve 398 may be opened to cool second clutch 127. Second clutch 127 may be cooled at a rate that is significantly greater when second clutch is open and valve 398 is open since flow of fluid to second clutch 127 may be ten times greater than flow of fluid to second clutch 127 when second clutch 127 is closed. In this example, fluid flow to second clutch 127 is via conduit 333, which services valve 398 and other devices. However, in other examples, conduit 333 may be directly coupled to valve 398 to provide more precise fluid flow control.

TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electrically driven transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanically driven pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Referring now to FIG. 4, an example method for shifting a transmission of a driveline to reduce a possibility of transmission degradation is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world.

At 402, method 400 determines a rolling average of energy received to first and second clutches of a dual clutch transmission. The first clutch may be clutch 126 of FIG. 3 and the second clutch may be clutch 127 of FIG. 3. In one example, energy received to a first clutch is energy that is input to the first clutch via the engine, but not transferred from an input side of the first clutch to an output side of the first clutch. Energy received to the first clutch may be transformed into heat that warms the first clutch and cooling fluid surrounding the first clutch. In one example, the amount of engine energy received to the first clutch may be determined via indexing or referencing a table that outputs an empirically determined amount of energy received by the first clutch. The values in the table may be a function of the amount of slip of the first clutch and the amount of power delivered by the engine to the first clutch. The energy received to the first clutch may be estimated via the following equation: $Clth1\_Engy = fun1(slip\_clth1, eng\_pwr)$ where $Clth1\_Engy$ is the energy received to the first clutch, $fun1$ is a function that returns an empirically determined amount of energy received to the first clutch, slip_cltch1 is present slip of the first clutch, and eng_pwr is an amount of power supplied by the engine to the clutch. The amount of slip of the first clutch may be determined via subtracting an output speed of the clutch from an input speed of the first clutch. The amount of power provided by the engine to the first clutch may be determined via multiplying engine speed by engine torque. The amount of energy received to the first clutch may be determined at a predetermined frequency (e.g., every 250 ms) and an average of a predetermined number of energy estimates may be averaged to provide a rolling average of energy received to the first clutch. The rolling average of energy received to the first clutch may be determined via the following equation:

$$\text{Cltch1\_roll} = \sum_{i=1}^{n} \frac{\text{Cltch1\_Engy}(i) + \text{Cltch1\_Engy}(i-1) + \text{Cltch1\_Engy}(i-2) + \ldots}{n},$$

where Cltch1_roll is a rolling average of energy received to the first clutch, n is a total number of first clutch energy estimates used to find the rolling average, and i is the sample number. The rolling average of energy received to the second clutch may be determined in a similar way. Method 400 proceeds to 404 after determining the rolling average of energy received to the first clutch and to the second clutch.

At 404, method 400 judges if the rolling average amount of energy received to the first or second transmission clutches is greater than a threshold value. The threshold value may be a predetermined value that is stored in non-transitory memory. If method 400 judges that the rolling average amount of energy received to the first transmission clutch is greater than the threshold value or if the rolling average amount of energy received to the second transmission clutch is greater than the threshold value, the answer is yes and method 400 proceeds to 406. Otherwise, the answer is no and method 400 proceeds to 430.

In addition, in some examples, a fraction of requested torque that is allocated to an electric machine may be increased and a fraction of the requested torque allocated to the engine may be reduced if the rolling average amount of energy received to the first or second transmission clutches is greater than the threshold value. For example, if 200 Nm of wheel torque is requested and the engine provides 150 Nm and the rear drive unit electric machine provides 50 Nm before a rolling average amount of energy received to the first or second transmission clutches is greater than a threshold value, the engine torque may be reduced to 130 Nm and the rear drive unit electric machine torque may be increased to 70 Nm after the rolling average amount of energy received to the first or second transmission clutches is greater than the threshold value so that any energy received via the closed remaining clutch may be reduced. Reducing energy received by the closed clutch may reduce the possibility of a temperature of the closed clutch increasing more than is desired.

At 430, method 400 operates the first and second transmission clutches according to a predetermined base shift schedule. The predetermined shift schedule opens the first or second clutch and closes the other of the first or second clutch to shift gears in response to vehicle speed and driver demand torque. For example, the first clutch may open so that first gear may be released at 20 Kph and then the second clutch may be closed so that engine torque may be transferred to second gear to rotate a half shaft and provide torque to vehicle wheels via second gear. Method 400 proceeds to exit after operating the first and second clutches.

At 406, method 400 judges if the clutch with a rolling average of received energy that is greater than the threshold is applied or closed. In one example, the clutch may be determined to be closed based on a value of a variable stored in transitory memory. In other examples, a sensor may provide an indication of clutch state. If method 400 judges that the clutch with a rolling average of received energy that is greater than the threshold value is applied, the answer is yes and method 400 proceeds to 420. Otherwise, the answer is no and method 400 proceeds to 408.

At 408, method 400 shifts only into and out of gears that may deliver engine power from a transmission input shaft to a transmission output shaft via a clutch that has received a rolling average amount of energy that is less than the threshold mentioned at 404. In one example, the transmission gears are shifted in response to a second predetermined shift schedule, vehicle speed, and driver demand torque. The transmission may be prohibited from shifting into gears that deliver engine power from a transmission input shaft to a transmission output shaft via a clutch that has received a rolling average amount of energy that is greater than the threshold mentioned at 404. For example, if the first transmission clutch received a rolling average amount of energy that is greater than a threshold and the first transmission clutch selectively delivers engine torque to first gear, third gear, and fifth gear, then the transmission may be prohibited from shifting into first, third, and fifth gears while the first transmission clutch is cooled. However, the transmission may shift into and out of second, fourth, and sixth gears according to the second shift schedule to propel the vehicle. It should be noted that a transmission shift schedule for shifting the transmission when a rolling average of the amount of energy that the first clutch has received is greater than a threshold may be different than a transmission shift schedule for shifting the transmission when the rolling average of the amount of energy the second clutch has received is greater than the threshold. Method 400 shifts the transmission according to a shift schedule and which clutch has received a rolling average of energy that is greater than the threshold value. Method 400 proceeds to 410.

At 410, method 400 applies a maximum amount of cooling to the transmission clutch that has received a rolling average amount of energy that is more than the threshold. In one example, method 400 provides a maximum amount of cooling via activating an electric pump and supplying fluid to cool the clutch that received a rolling average amount of energy that exceeded the threshold. Fluid to cool the clutch that received the rolling average amount of energy that exceeded the threshold may be delivered to the clutch that received the rolling average amount of energy that exceeded the threshold by opening a valve (e.g., 397 or 398 of FIG. 3). In other examples, fluid may be supplied to the clutch that received the rolling average amount of energy that exceeded the threshold via both a mechanical driven pump and an electrically driven pump. The fluid is supplied while the clutch is open so that clutch cooling may be improved by increasing a rate that fluid is supplied to the clutch. Method 400 proceeds to 412 after maximizing cooling of the clutch.

At 412, method 400 judges if maximum cooling has been applied to the clutch that received the rolling average amount of energy that exceeded the threshold for greater than a threshold amount of time. If so, the answer is yes and method 400 proceeds to exit. Otherwise, the answer is no and method 400 returns to 408. The threshold amount of time may be an amount of time that is expected for the clutch's temperature to be reduced to less than a threshold temperature. Further, if method 400 judges that the maximum cooling has been applied to the clutch that received the rolling average amount of energy that exceeded the threshold for greater than the threshold amount of time, the amount of time that maximum cooling is provided to the clutch that received the rolling average amount of energy that exceeded the threshold is reset to zero and the rolling average amount of energy received to the clutch is adjusted to a present amount of energy received to the clutch.

At 420, method 400 opens the clutch that received the rolling average amount of energy that exceeded the threshold. Further, method 400 shifts to a gear that may be supplied power from the engine via the clutch that received less than the rolling average amount of energy to exceed the threshold. The gear that is shifted into, or the gear that is engaged, is a gear nearest to the gear being exited. For example, if the first clutch has received a rolling average amount of energy that exceeds the threshold mentioned at 404 and third gear is engaged, the transmission may be shifted into fourth gear via the second clutch if vehicle speed is increasing. However, the transmission may be shifted into second gear if vehicle speed is decreasing. Method 400 proceeds to 422.

At 422, method 400 applies a maximum amount of cooling to the transmission clutch that has received a rolling average amount of energy that is more than the threshold. Method 400 returns to 406 after maximizing cooling of the clutch.

In this way, a dual clutch transmission may be operated to reduce the possibility of clutch degradation. The dual clutch transmission may be shifted according to vehicle speed and driver demand torque while avoiding shifting into transmission gears that may transfer engine torque from an input shaft of the dual clutch transmission to vehicle wheels via a clutch that has received a rolling average amount of energy that exceeds a threshold. The present method uses energy supplied to the first and second clutches to determine how the transmission is shifted. In alternative embodiments, rolling averages of temperatures of the first and second clutches may be substituted for the rolling average amount of energy received to the first and second clutches.

Referring now to FIG. 5, a prophetic operating sequence according to the method of FIG. 4 is shown. The vehicle operating sequence shown in FIG. 5 may be provided via the method of FIG. 4 in cooperation with the system shown in FIGS. 1A-3. The plots shown in FIG. 5 occur at the same time and are aligned in time.

The first plot from the top of FIG. 5 is a plot of a rolling average amount of energy received to a first transmission clutch versus time. The first transmission clutch may supply engine torque to vehicle wheels via a first torque path, the first torque path including the first transmission clutch (e.g., 126), a first transmission input shaft (e.g., 302), gears (e.g., 314 and 318) coupling the first transmission input shaft to first and second half shafts (e.g., 340 and 342), the first and second half shafts coupled to an output shaft (e.g., 362). The vertical axis represents a rolling average of an amount of energy received to the first clutch. The amount of energy received to the first clutch increases in the direction of the vertical axis arrow. The horizontal axis represents time and time increases from the left side of the figure to the right side of the figure. Horizontal line 502 represents a threshold average energy amount received to the first clutch that when exceeded instigates additional cooling of the first clutch and revisions to the transmission shifting schedule.

The second plot from the top of FIG. 5 is a plot of the first clutch's operating state versus time. The vertical axis represents clutch operating state. The first clutch is closed and may transfer engine torque when the trace is at a high level near the vertical axis arrow. The first clutch is open and may not transfer engine torque when the trace is at a low level near the horizontal axis. The horizontal axis represents time and time increases from the left side of the figure to the right side of the figure.

The third plot from the top of FIG. 5 is a plot of first clutch cooling flow (e.g., flow of fluid to cool the first clutch) versus time. The vertical axis represents first clutch cooling flow and flow increases in the direction of the vertical axis up arrow. The horizontal axis represents time and time increases from the left side of the figure to the right side of the figure.

The fourth plot from the top of FIG. 5 is a plot of a rolling average amount of energy received to a second transmission clutch versus time. The second transmission clutch may supply engine torque to vehicle wheels via a second torque path, the second torque path including the second transmission clutch (e.g., 127), a second transmission input shaft (e.g., 304), gears (e.g., 308 and 316) coupling the second transmission input shaft to first and second half shafts (e.g., 340 and 342), the first and second half shafts coupled to an output shaft (e.g., 362). The vertical axis represents a rolling average of an amount of energy received to the second clutch. The amount of energy received to the second clutch increases in the direction of the vertical axis arrow. The horizontal axis represents time and time increases from the left side of the figure to the right side of the figure. Horizontal line 504 represents a threshold average energy amount received to the second clutch that when exceeded instigates additional cooling of the second clutch and revisions to the transmission shifting schedule.

The fifth plot from the top of FIG. 5 is a plot of the second clutch's operating state versus time. The vertical axis represents clutch operating state. The second clutch is closed and may transfer engine torque when the trace is at a high level near the vertical axis arrow. The second clutch is open and may not transfer engine torque when the trace is at a low level near the horizontal axis. The horizontal axis represents time and time increases from the left side of the figure to the right side of the figure.

The sixth plot from the top of FIG. 5 is a plot of second clutch cooling flow (e.g., flow of fluid to cool the first clutch) versus time. The vertical axis represents second clutch cooling flow and flow increases in the direction of the vertical axis up arrow. The horizontal axis represents time and time increases from the left side of the figure to the right side of the figure.

The seventh plot from the top of FIG. 5 is a plot of which transmission gear is engaged versus time. The vertical axis represents engaged gear and the gear numbers are posted along the vertical axis. The horizontal axis represents time and time increases from the left side of the figure to the right side of the figure.

The eighth plot from the top of FIG. 5 is a plot of transmission electric pump flow versus time. The transmission electric pump supplies cooling fluid to the first and second transmission clutches. The vertical axis represents transmission electric pump flow and flow increases in the direction of the vertical axis arrow. The horizontal axis represents time and time increases from the left side of the figure to the right side of the figure.

The horizontal axis of each plot corresponds to a value of zero for the vertical axis unless otherwise noted. Further, the vertical axis of each plot corresponds to a value of zero time.

At time T0, the transmission is in neutral and the first clutch and second clutch average received energy is near zero. The first clutch and second clutch cooling flow is at a low level and the transmission electric pump is not activated. The first and second clutches are also in an open state.

At time T1, first gear is engaged and the first clutch begins to close. The first clutch slips and the average energy received to the first clutch increases as the first clutch slips. The second clutch remains open and its average energy received remains near zero. The cooling flow of the first and second clutches remains at a lower level. The transmission electric pump flow remains at zero. The transmission is shifted according to a first base shift schedule (not shown).

At time T2, the average energy received to the first clutch increases to a level exceeding threshold 502. As a result, the first clutch is opened and the transmission shifts from first gear to second gear. The second clutch closes to direct engine power through second gear to vehicle wheels (not shown). In addition, the transmission electric pump is activated and its flow is adjusted responsive to the average energy received to the first clutch. Since the first clutch is opened and the electric pump is activated, cooling flow to the first clutch begins to increase. The average energy received to the second clutch begins to increase in response to the second clutch beginning to close. Second clutch cooling flow remains at a lower level.

Between time T2 and time T3, the second clutch closes, opens, and closes so that the transmission may shift from second gear to fourth gear as vehicle speed increases (not shown). The transmission is shifted according to a second shift schedule for shifting when the first clutch is not available for shifting. The transmission pump flow levels out to a lower middle level and the first clutch remains open. The average amount of energy received to the first clutch levels off and begins to decrease. The average amount of energy received to the second clutch remains below threshold 504.

At time T3, the transmission pump has provided increased cooling to the first clutch for a predetermined amount of time and the average amount of energy received to the first clutch has been reduced to less than threshold 502. As a result, the transmission is once again permitted to close the first clutch and engage gears that may be supplied engine torque via the first clutch. The transmission remains in fourth gear and the transmission electric pump is deactivated in response to cooling to the first clutch being provided for a threshold amount of time.

Between time T3 and time T4, the transmission is shifted from fourth gear to fifth gear before being downshifted to second gear and then neutral. The transmission is shifted according to the base shift schedule (not shown). The average energy received to the first and second clutches remains below thresholds 502 and 504. The transmission electric pump remains deactivated and the cooling flow to the first and second clutches is at a lower level. The first and second clutches open and close to shift the transmission gears.

At time T4, the vehicle is launched from zero speed by engaging first gear and closing the first clutch. The first clutch slips and begins to increase the average energy received to the first clutch. The second clutch remains open and cooling to the first and second clutch is at a lower level.

Between time T4 and time T5, the average energy received to the first clutch increases to a level exceeding threshold 502. As a result, the first clutch is opened and the transmission shifts from first gear to second gear. The second clutch closes to direct engine power through second gear to vehicle wheels (not shown). Further, the transmission electric pump is activated a second time and its flow is adjusted responsive to the average energy received to the first clutch. Since the first clutch is opened and the electric pump is activated, cooling flow to the first clutch begins to increase. The average energy received to the second clutch begins to increase in response to the second clutch opening and closing as the transmission shifts. The transmission is shifted according to the second shift schedule and shifting into gears that may receive engine power via the first clutch is prohibited. The transmission is skip shifted via the second clutch between time T4 and time T5 after the first clutch is opened. The skip shifting may be identified by shifting from second gear to fourth gear such that shifting into third gear is skipped.

At time T5, increased cooling has been provided to the first clutch via the transmission electric pump for a threshold amount of time and the average energy received to the first clutch is less than threshold 502 so that the transmission may be shifted according to a base shift schedule. The base shift schedule allows shifting between all transmission gears by opening and closing the first and second clutches. Cooling flow to the first clutch is reduced and the transmission electric pump is deactivated in response to cooling being provided to the first clutch for the threshold amount of time.

In this way, a transmission may be shifted to accelerate a vehicle without having to use a clutch that has a higher average level of received energy. The clutch that has the higher level of received energy may be cooled at a faster rate since the clutch is held in an open state and because flow of coolant to the clutch may be increased.

Referring now to FIG. 6, an example method for shifting a transmission of a driveline to reduce a possibility of transmission degradation is shown. The method of FIG. 6 may be incorporated into and may cooperate with the system of FIGS. 1A-3. Further, at least portions of the method of FIG. 6 may be incorporated as executable instructions stored in non-transitory memory while other portions of the method may be performed via a controller transforming operating states of devices and actuators in the physical world.

At 602, method 600 determines a rolling average of energy received to first and second clutches of a dual clutch transmission. The first clutch may be clutch 126 of FIG. 3 and the second clutch may be clutch 127 of FIG. 3. In one example, energy received to a first clutch is energy that is input to the first clutch via the engine, but not transferred from an input side of the first clutch to an output side of the first clutch. Energy received to the first clutch may be transformed into heat that warms the first clutch and cooling fluid surrounding the first clutch. In one example, the amount of engine energy received to the first clutch may be determined via indexing or referencing a table that outputs an empirically determined amount of energy received by the first clutch. The values in the table may be a function of the amount of slip of the first clutch and the amount of power delivered by the engine to the first clutch. The energy received to the first clutch may be estimated via the following equation: Clth1_Engy=fun1(slip_clth1, eng_pwr) where Clth1_Engy is the energy received to the first clutch, fun1 is a function that returns an empirically determined amount of energy received to the first clutch, slip_clth1 is present slip of the first clutch, and eng_pwr is an amount of power supplied by the engine to the clutch. The amount of slip of the first clutch may be determined via subtracting an output speed of the clutch from an input speed of the first clutch.

The amount of power provided by the engine to the first clutch may be determined via multiplying engine speed by engine torque. The amount of energy received to the first clutch may be determined at a predetermined frequency (e.g., every 250 ms) and an average of a predetermined number of energy estimates may be averaged to provide a rolling average of energy received to the first clutch. The rolling average of energy received to the first clutch may be determined via the following equation:

$$Cltch1\_roll = \sum_{i=1}^{n} \frac{Cltch1\_Engy(i) + Cltch1\_Engy(i-1) + Cltch1\_Engy(i-2) + \ldots}{n},$$

where Cltch1_roll is a rolling average of energy received to the first clutch, n is a total number of first clutch energy estimates used to determine the rolling average, and i is the sample number. The rolling average of energy received to the second clutch may be determined in a similar way. Method 600 proceeds to 604 after determining the rolling average of energy received to the first clutch and to the second clutch.

At 604, method 600 judges if the rolling average amount of energy received to the first or second transmission clutches is greater than a threshold value. The threshold value may be a predetermined value that is stored in non-transitory memory. If method 600 judges that the rolling average amount of energy received to the first transmission clutch is greater than the threshold value or if the rolling average amount of energy received to the second transmission clutch is greater than the threshold value, the answer is yes and method 600 proceeds to 606. Otherwise, the answer is no and method 600 proceeds to 630.

At 620, method 600 operates the first and second transmission clutches according to a predetermined base shift schedule. The predetermined shift schedule opens the first or second clutch and closes the other of the first or second clutch to shift gears in response to vehicle speed and driver demand torque. For example, the first clutch may open so that first gear may be released at 20 Kph and then the second clutch may be closed so that engine torque may be transferred to second gear to rotate a half shaft and provide torque to vehicle wheels via second gear. Method 400 proceeds to exit after operating the first and second clutches.

At 606, method 600 operates the first and second transmission clutches as described at steps 406-422 of FIG. 4. Method 600 proceeds to 608.

At 608, method 600 activates the transmission electric pump and adjusts pump output (e.g., flow) responsive to an average amount of energy received to the first or second clutch that exceeds a threshold. In one example, flow output of the electrically driven pump increases as the average energy received to the clutch that received the rolling average amount of energy that exceeded the threshold increases. Method 600 proceeds to 610.

At 610, method 600 judges if maximum cooling has been applied to the clutch that received the rolling average amount of energy that exceeded the threshold for greater than a threshold amount of time. If so, the answer is yes and method 600 proceeds to exit. Otherwise, the answer is no and method 600 returns to 606. The threshold amount of time may be an amount of time that is expected for the clutch's temperature to be reduced to less than a threshold temperature. Further, if method 600 judges that the maximum cooling has been applied to the clutch that received the rolling average amount of energy that exceeded the threshold for greater than the threshold amount of time, the amount of time that maximum cooling is provided to the clutch that received the rolling average amount of energy that exceeded the threshold is reset to zero and the rolling average amount of energy received to the clutch may be adjusted to a present amount of energy received to the clutch.

In this way, cooling of a transmission clutch may be adjusted responsive to a rolling average of energy received to a transmission clutch. In other examples, cooling of the transmission clutch may be adjusted responsive to clutch temperature.

Referring now to FIGS. 7A and 7B, a method for selecting and activating driveline control modes is shown. The method of FIGS. 7A and 7B may be incorporated into and may cooperate with the system of FIGS. 1A-3. Further, at least portions of the method of FIGS. 7A and 7B may be incorporated as executable instructions stored in non-transitory memory while other portions of the method may be performed via a controller transforming operating states of devices and actuators in the physical world.

At 702, method 700 determines driver demand. Driver demand may be a wheel torque driver demand or a torque at another location along the driveline, such as at a transmission output shaft. In one example, the driver demand is a function of accelerator pedal position and vehicle speed. The accelerator position and vehicle speed index or reference a table in memory that holds empirically determined values of wheel torque or other torques. The table outputs the driver demand torque. Method 700 proceeds to 704.

At 704, method 700 determines a maximum or upper threshold transmission input torque not to be exceeded. In one example, method 700 indexes or references a variable in memory that is a maximum or upper threshold. The value of the variable may be empirically or calculated. Method 700 proceeds to 706.

At 706, method 700 judges if the transmission is unable to transmit torque. The transmission may be unable to transmit torque if a clutch, synchronizer, or other component is degraded. Method 700 may judge that a transmission component is degraded based on transmission operating conditions, such as clutch slip, transmission input speed, and transmission output speed. If method 700 judges that the transmission is unable to transmit torque, the answer is yes and method 700 proceeds to 708. Otherwise, the answer is no and method 700 proceeds to 730.

At 708, method 700 begins to take actions to operate the vehicle driveline in a series mode. Method 700 proceeds to 710.

At 710, method 700 fully opens transmission clutches to mechanically decouple the engine and the ISG from vehicle wheels. Method 700 proceeds to 712 after opening the transmission clutches.

At 712, method 700 determines a desired electric machine torque. The desired electric machine torque may be a desired torque of the rear drive unit electric machine, a desired torque of the front drive unit electric machine, or desired torques for the front drive unit and rear drive unit electric machines. The desired electric machine torque may be a function of driver demand, battery state of charge, and other vehicle conditions. Method 700 proceeds to 714.

At 714, method 700 adjusts engine torque to driver demand torque minus electric machine torque. Method 700 proceeds to 716.

At 716, method 700 adjusts ISG torque to minus engine torque. Method 700 proceeds to 718.

At 718, method 700 adjusts rear drive unit electric machine torque and/or front drive unit electric machine torque to driver demand torque. Thus, the vehicle may be propelled responsive to driver demand even when the transmission may not transfer torque. Method 700 proceeds to exit.

In this way, the driveline may be operated in a series mode where propulsive torque is provided via an electric machine. Further, torque is not transmitted through the transmission while the driveline operates in series mode.

At 730, method 700 measures transmission output shaft speed. Transmission output shaft speed may be determined via a speed sensor. Method 700 proceeds to 732.

At 732, method 700 judges if transmission output shaft speed multiplied by a ratio of $1^{st}$ gear (e.g., lowest transmission gear) is less than engine idle speed (e.g., 700 RPM). The ratio or $1^{st}$ gear may be stored in controller memory. If method 700 judges that transmission output shaft speed multiplied by $1^{st}$ gear ratio is less than engine idle speed, the answer is yes and method 700 proceeds to 734. Otherwise, the answer is no and method 700 proceeds to 760.

At 734, method 700 judges if series driveline operation is preferred. In one example, driveline series operation may be preferred if battery state of charge is higher than a threshold. If method 700 judges that series driveline operation is preferred, the answer is yes and method 700 proceeds to 736.

At 736, method 700 determines a maximum or upper threshold motor torque limit. The maximum motor torque may be for the front or rear drive unit electric machine. In one example, a value of the maximum motor torque is stored in memory and retrieved by method 700. Method 700 proceeds to 738.

At 738, method 700 judges if the maximum motor torque threshold is greater than the driver demand torque. If so, the answer is yes and method 700 proceeds to 740. Otherwise, the answer is no and method 700 proceeds to 768.

At 740, method 700 judges if a sum of battery discharge torque (e.g., an amount of torque that may be provided by one or more electric machines to the driveline subject to battery discharge limitations) and ISG discharge torque limit are greater than driver demand. If so, the answer is yes and method 700 proceeds to 708 to enter the driveline into series mode. Otherwise, method 700 proceeds to 768.

At 750, method 700 measures the dual clutch transmission input shaft speed. The input shaft speed may be a speed of one of the two input shafts (e.g., the input shaft that supplies torque to the presently engaged transmission gear). The input shaft speed may be determined from a speed sensor. Method 700 proceeds to 752.

At 752, method 700 measures engine speed. Engine speed may be measured via an engine speed sensor. Method 700 proceeds to 754.

At 754, method 700 determines a maximum torque capacity of the dual clutch transmission clutch that is transferring engine torque to vehicle wheels. In one example, clutch slip (e.g., engine speed minus transmission input shaft speed) is input to a function of empirically determined values of clutch torque capacity (e.g., an amount of torque a clutch may transfer from its input to its output) and the function outputs a maximum or upper threshold amount of torque that may be transferred from the engine to the vehicle wheels via the clutch that is at least partially closed. Method 700 proceeds to 756 after determining the clutch torque capacity.

At 756, method 700 judges if the driver demand torque is less than the maximum torque capacity of the clutch determined at 754. If so, the answer is yes and method 700 proceeds to 758. Otherwise, the answer is no and method 700 proceeds to 736.

At 758, method 700 judges if rapid clutch cooling is desired. In one example, method 700 judges that rapid clutch cooling is desired if an average amount of energy received to a transmission clutch is greater than a threshold. If so, the answer is yes and method 700 proceeds to 736. Otherwise, the answer is no and method 700 proceeds to 768.

At 760, method 700 fully closes the dual clutch transmission clutch that is transferring engine torque to vehicle wheels. In one example, the clutch is fully closed when clutch slip is less than a predetermined value. Method 700 proceeds to 762.

At 762, method 700 judges if driver demand determined at 702 is less than the maximum transmission input torque determined at 704. If so, the answer is yes and method 700 proceeds to 768. Otherwise, the answer is no and method 700 proceeds to 764.

At 764, method 700 determines a desired electrical torque. The desired electrical torque is an electric torque provided by one or more of the driveline electric machines. In one example, the desired electrical torque is determined from driver demand torque and battery state of charge. A table or function may output a desired electric torque from empirically determined values stored in a table or function that may be referenced or indexed via driver demand torque and battery state of charge. Method 700 proceeds to 766.

At 766, method 700 judges if the desired electrical torque is greater than a difference between driver demand torque and the maximum transmission input torque. If so, the answer is yes and method 700 proceeds to 768. Otherwise, the answer is no and method 700 proceeds to 780.

At 768, method 700 begins actions to operate the hybrid driveline in parallel mode (e.g., engine torque is summed with torque from electric machines, such as the ISG, rear drive unit electric machine, and front drive unit electric machine, when the engine and electric machines are applying torque in a same direction). Method 700 proceeds to 770.

At 770, method 700 determines a desired electric machine torque. The desired electric machine torque may be a function of battery state of charge, driver demand torque, and other driveline torques. Method 700 may determine the desired electric machine torque via empirically determined values of electric machine torque. Method 700 proceeds to 772.

At 772, method 700 determines a desired torque split to provide the electric torque determined at 770. In one example, the electric torque value may be partitioned between the ISG, rear drive unit electric machine, and front drive unit electric machine. For example, the ISG may provide 10% of the electric torque, the rear drive unit may provide 60% of the electric torque, and the front drive unit electric machine may provide 30% of the electric torque. The particular fraction of electric machine torque allocated to each electric machine may be stored as empirically determined values in controller memory. Further, if the driveline includes other electric machines, the torque amount allocated to these machines is determined at 772 in a similar way. Method 700 proceeds to 774.

At 774, method 700 commands the ISG, front drive unit electric machine, and rear drive unit electric machine and any other driveline electric machine to their respective values according to the torque allocations determined at 772. Method 700 proceeds to exit.

At 780, method 700 begins actions to operate the hybrid driveline in series-parallel mode (e.g., engine torque is summed with torque from electric machines, such as the ISG, rear drive unit electric machine, and front drive unit electric machine, when the engine and one or more electric machines are applying torque in different direction than the engine). Method 700 proceeds to 782.

At 782, method 700 determines a desired electric machine torque. The desired electric machine torque may be a function of battery state of charge, driver demand torque, and other driveline torques. Method 700 may determine the desired electric machine torque via empirically determined values of electric machine torque. Method 700 proceeds to 784.

At 784, method 700 adjusts rear drive unit electric machine torque to a value equal to driver demand minus the transmission maximum torque threshold. The rear drive unit electric machine torque may be adjusted via adjusting a current or voltage applied to the rear drive unit electric machine. Method 700 proceeds to 786.

At 786, method 700 adjusts ISG torque equal to a value of the electric torque minus the rear drive unit electric machine torque. The ISG torque may be adjusted via adjusting a field current of the ISG or via another known method. Method 700 proceeds to 788.

At 788, method 700 adjusts engine torque to ISG torque plus the maximum transmission torque threshold. The engine torque may be adjusted via one or more engine torque actuators such as the engine throttle, cams, spark timing, and fuel injection amount. Method 700 proceeds to exit.

Thus, the methods describe herein provide for a driveline operating method, comprising: delivering engine torque to vehicle wheels via a first clutch and a second clutch, the first clutch transmitting engine torque to the vehicle wheels via a first group of gears, the second clutch transmitting engine torque to the vehicle wheels via a second group of gears; and delivering engine torque to the vehicle wheels only via the second clutch in response to an amount of energy absorbed via the first clutch exceeding a threshold. The method further comprises delivering engine torque to the vehicle wheels only via the first clutch in response to an amount of energy absorbed via the second clutch exceeding a threshold. The method further comprises activating an electric pump and cooling the first clutch via fluid supplied from the electric pump in response to the amount of energy absorbed via the second clutch exceeding the threshold.

In some examples, the method further comprises activating an electric pump and cooling the first clutch via fluid supplied from the electric pump in response to the amount of energy absorbed via the first clutch exceeding the threshold. The method includes where the first clutch transmits engine torque to odd numbered transmission gears, and where the second clutch transmits engine torque to even numbered transmission gears. The method further comprises skip shifting from a first gear that is provided engine torque through the second clutch to a second gear that is provided engine torque through the second clutch without shifting into a gear that is provided engine torque through the first clutch. The method further comprises increasing a fraction of requested wheel torque delivered via an electric machine in response to the amount of energy absorbed via the first clutch exceeding the threshold.

The methods described herein also provide for a driveline operating method, comprising: delivering engine torque to vehicle wheels via a first clutch and a second clutch, the first clutch transmitting engine torque via a first group of gears, the second clutch transmitting engine torque via a second group of gears; and adjusting flow of a pump in response to an amount of energy absorbed via the first clutch exceeding a threshold. The method includes where the pump supplies fluid to cool the first clutch. The method includes where flow of the pump is adjusted via adjusting a voltage or current supplied to the pump. The method includes where the flow of the pump is adjusted responsive to an amount of energy absorbed via the first clutch. The method further comprises adjusting flow of the pump in response to an amount of energy absorbed via the second clutch exceeding a threshold. The method further comprises activating the pump in response to the amount of energy absorbed via the first clutch exceeding the threshold. The method further comprises delivering engine torque to the vehicle wheels only via the second clutch in response to an amount of energy absorbed via the first clutch exceeding the threshold.

The methods described herein also provide for a driveline operating method, comprising: selecting a driveline operating mode from a group including series mode, parallel mode, and series/parallel mode responsive to a transmission's capacity to deliver torque to vehicle wheels, a multiple of transmission output shaft speed, driver demand torque, and a desired electrical torque; and operating a driveline in the selected driveline operating mode. The method includes where the multiple of transmission output speed is a ratio of a transmission's first gear multiplied by a transmission output shaft speed. The method further comprises selecting the driveline operating mode in further response to a capacity of a clutch. The method further comprises selecting the driveline operating mode in further response to a temperature of a clutch. The method further comprises activating a pump in response to the temperature of the clutch. The method further comprises selecting the driveline operating mode in further response to a maximum motor torque being greater than a driver demand torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
selecting a driveline operating mode from a group including series mode, parallel mode, and series/parallel mode responsive to a transmission's capacity to deliver torque to vehicle wheels, a multiple of transmission output shaft speed, driver demand torque, and a desired electrical torque, the transmission including first and second layshafts coupled via respective first and second clutches to an engine output, a motor coupled downstream of the transmission and coupled via a transmission output to the first and second layshafts; and
operating a driveline in the selected driveline operating mode, including, in response to output shaft speed multiplied by a first gear ratio being less than engine idle speed, fully closing one or more of the first and second transmission clutches.

2. The method of claim 1, further comprising selecting the driveline operating mode in further response to a capacity of one or more of the first and second clutches.

3. The method of claim 1, further comprising selecting the driveline operating mode in further response to a temperature of a clutch.

4. The method of claim 3, further comprising activating a pump in response to the temperature of the clutch.

5. The method of claim 1, further comprising selecting the driveline operating mode in further response to a maximum motor torque being greater than a driver demand torque.

6. The method of claim 1, further comprising, along with fully closing one or more of the first and second transmission clutches, selecting between only the parallel mode and the series-parallel mode.

7. The method of claim 6, wherein the selection between only the parallel and series-parallel modes is responsive to driver demand being less than a maximum transmission input torque threshold.

8. The method of claim 7, further comprising, in response to the driver demand being less than the maximum transmission input torque threshold, selecting the parallel mode and, otherwise, selecting the series-parallel mode.

9. The method of claim 1, further comprising selecting the driveline operating mode in response to a maximum motor torque threshold relative to driver demanded torque.

10. The method of claim 9, wherein the selecting the driveline operating mode is further in response to a sum of a battery discharge torque threshold and the motor torque threshold being larger than driver demanded torque.

11. The method of claim 10, further comprising, in response to both a maximum motor torque threshold greater than driver demanded torque and the sum of the battery discharge torque threshold and the motor torque threshold being larger than driver demanded torque, selecting the series mode.

* * * * *